United States Patent [19]

Doleschall et al.

[11] Patent Number: 4,903,773

[45] Date of Patent: * Feb. 27, 1990

[54] METHOD FOR INJECTING WATER IN FLUID-STORING ROCKS CONTAINING CLAY MATERIALS

[75] Inventors: Sándor Doleschall, Budapest; Györgyi Gaál, Nagykanizsa; Miklós Kristóf, Szolnok; Gyula Milley; Tibor Paál, both of Nagykanizsa; József Pápay, Budapest; Antal Szittár, Zalaegerszeg; Géza Udvardi, Nagyanizsa, all of Hungary

[73] Assignee: Magyar Szénhidrogénipari Kutató-/fejlesztö Intézet, Szazhalombatta, Hungary

[ * ] Notice: The portion of the term of this patent subsequent to Jan. 24, 2006 has been disclaimed.

[21] Appl. No.: 319,830

[22] Filed: Mar. 3, 1989

Related U.S. Application Data

[63] Continuation of Ser. No. 96,752, Sep. 11, 1987, abandoned, which is a continuation of Ser. No. 899,253, Aug. 22, 1986, abandoned.

[30] Foreign Application Priority Data

Aug. 29, 1985 [HU] Hungary .............................. 3263/85

[51] Int. Cl.$^4$ ...................... E21B 43/22; E21B 43/24
[52] U.S. Cl. .................................. 166/303; 166/305.1
[58] Field of Search ................................ 166/272–275, 166/303, 305.1, 306, 307

[56] References Cited

U.S. PATENT DOCUMENTS

| | | | |
|---|---|---|---|
| 4,230,183 | 10/1980 | Kalfoglou | 116/305.1 X |
| 4,366,071 | 12/1982 | McLaughlin et al. | 166/305.1 X |
| 4,366,072 | 12/1982 | McLaughlin et al. | 166/305.1 X |
| 4,366,073 | 12/1982 | McLaughlin et al. | 166/305.1 X |
| 4,366,074 | 12/1982 | McLaughlin et al. | 166/305.1 X |
| 4,462,718 | 7/1984 | McLaughlin et al. | 166/305.1 X |
| 4,532,052 | 7/1988 | Weaver et al. | 166/307 X |
| 4,799,551 | 1/1989 | Bauer et al. | 166/273 X |

*Primary Examiner*—George A. Suchfield
*Attorney, Agent, or Firm*—Schweitzer & Cornman

[57] ABSTRACT

A method for injecting water into fluid storing rocks containing clay minerals, in particular in hydrocarbon sites formed by sandstones, sands, marlaceous sandstones, water storing rocks, geothermic circulation sites, in zones in the vicinity of wells, extending to large sites. Continuously or discontinuously compounds are introduced into the storing rocks having a hydrated cation diameter in the range between 0.13 and 0.15 nm, a coordination number 12. The compounds are preferably potassium-, and/or ammonium-, and/or zirconium salts. Depending on the clay content of the storing rock, stabilization is performed by using a solution of the enumerated salts in a concentration of 0.1–500 g/l, advantageously 0.1 to 300 g/l, and in a quantity of 0.5 to 5000 m$^3$, preferably 50 to 3000 m$^3$, which is related to the vertical dimension of the rock, expressed in meters.

7 Claims, No Drawings

METHOD FOR INJECTING WATER IN FLUID-STORING ROCKS CONTAINING CLAY MATERIALS

This is a continuing application of U.S. Serial No. 096,752, filed on Sep. 11, 1987, which is a continuing application of U.S. Serial No. 899,253, filed on Aug. 22, 1986, both now abandoned.

BACKGROUND

1. Field of the Invention

The invention relates to an improved method for injecting water into fluid storing rocks containing clay minerals such as hydrocarbon sites formed by sandstones, sands and marlitic sandstones, water storing rocks, geothermic circulation sites, and zones in the vicinity of wells extending to large sites.

2. Description of the Prior Art

It is a well-known fact that after primary exploitation of rocks which store hydrocarbons, a considerable amount, about 60% to 75%, of the original (geological) reserves remains unexploited. For the further exploitation of such remaining hydrocarbons, in particular mineral oils, fluid transfer used to be applied from aqueous storing tracts or, in the majority of cases, through properly formed wells, fluid is forced out. Nevertheless, a plurality of secondary and tertiary exploiting methods have been elaborated and up to now simple injection of water has proven to be the most frequently used and most inexpensive solution. From the point of view of economics, such a solution is advantageous. However, success in using such a method cannot always be accomplished since in certain cases difficulties arise because of the characteristics of the water storing rocks. Thus, injecting the water into the rocks may cause problems and the rocks may not adequately retain the water for subsequent injections. In the first phase of injecting water, one is confronted with a problem scarcely dealt with in technical literature, i.e. compatibility of the storing rock and injected aqueous solutions. Thus, injected chemical substances suffer losses in respect to sorption and degradation, and from the moment the the fluid contacts the rock there can be problems with the stability of the rock, state and stability of clay minerals, maintenance of injectability, changes and decline of natural equilibrium, or quasi-equilibrium, and the consequences thereof.

It is also well known that permeability of storing rocks, in particular sandstones containing clay minerals, sands and marlitic sands always depends on the pore structure. However, the presence of mineral clays complicates this simple situation, as their chemical and physical condition depends fundamentally on the ionic environment. Particularly affected are swelling clay materials which change not only their pore structure but also their chemical state in the course of the ion exchange processes which take place in the aqueous phase. The mineral clays of the layer structure 2:1 are capable of swelling, meaning there is an increase in the decrease of cell dimensions in the direction of the C-axis. The change depends on which ions occupy (bind) the free negative charges in the layer structure of clay minerals. If considerable expansion of the clay minerals results in their dispersion, it is quite obvious that hydrodynamic properties of the rock will be negatively influenced.

By analysing the problems from this aspect, it can be stated that, apart from some gas injecting processes, e.g. ethane, gas rich in ethane, etc, in nearly all cases control of sorption phenomena and elimination of detrimental hydrodynamic effects resulting from clay mineral swelling and structural collapse ought to be eliminated. It is well known that we cannot deal merely with ion-exchange, sorption, dispersion or electrostatic dispersion, since these processes take place simultaneously and their advantageous modification may result in diverse effects. As a consequence, if we speak about the changes and modifications of clay minerals, it seems to be expedient to speak uniformly about a clay-effect. We can also refer to decrease, control (exclusion) of its activity inhibition.

It is quite obvious that in the cases of all fluid injection processes, particularly injection of water or aqueous solutions, natural ionic equilibrium will be disturbed in the injection zone in the environment of wells. Clay minerals are also involved in said disturbance of the state of equilibrium. Generally, the less compatible the injected water is with the original ionic background of the system, i.e. with the clay minerals, the greater the disturbance to the natural ionic equilibrium. For this reason it is very important that prior to every single injection process both clay minerals and natural state of equilibrium of rock-liquid be carefully analyzed.

SUMMARY OF THE INVENTION

The object of the invention is to eliminate said deficiencies, i.e. to improve the process of injecting water into fluid storing rocks containing clay minerals, i.e. into the hydrocarbon sites contained therein, which, when compared to known processes, can be much more efficient.

Another object of the invention is to establish the best possible compatibility between the storing rock and the injected water or aqueous solution.

The invention is based on the recognition, in so far as the objects can be accomplished, that if activity of changes of clay minerals present in the storing rocks is controlled, the so-called clay-effect inhibition is performed.

The objects have been fulfilled by using the process as specified in our preamble, wherein compounds are continuously or discontinuously introduced into the storing rocks, which compounds have a hydrated cation diameter preferably in the range between 0.13 and 0.15 nm and a coordination number 12. The compounds are preferably potassium-, ammonium- and/or zirconium salts. The storing rock is stabilized, taking into account its clay content, by using said salts in a solution of a concentration of 0.1–500 g/l, advantageously 0.1–300 g/l, and in a quantity of 0.5–5000 m$^3$, preferably 50–3000 m$^3$, related to the vertical dimension of the rock expressed in meters.

DETAILED DESCRIPTION

In order to facilitate the technique, it is considered as advantageous if the total quantity of the potassium-, ammonium- and/or zirconium salts to be injected for the stabilization of the storing rocks is not introduced in a constant concentration, but as a mixture of said ions within the proportion range $K^+:NH_4^+ = 0.01-500$; $K^+:ZrO^{++} = 0.01-300$; $(K^+ + NH_4^+):ZrO^{++} = 0.01-300$, by adjusting continuously or gradually increasing or decreasing proportions, using increasing or decreasing stages of concentrations, continuously or discontinuously, with or without any inserted separating fluid plugs, in cycles consisting of two or more smaller plugs.

With the purpose to increase productivity, we proceed so that potassium-, ammonium and/or zirconium compounds to be injected into the storing rocks for stabilization are injected with water steam, or a mixture of water steam and vapor of organic compound(s), water steam and/or gases, continuously or discontinuously, in one or more plugs, in a constant and/or continuously or gradually increasing and/or decreasing concentration.

To increase further productivity of the process it is considered as advantageous if the potassium-, ammonium- and/or zirconium compounds stabilizing the storing rock are introduced in an aqueous solution and/or in the steam-phase, continuously or discontinuously combined, using one or more aqueous and/or gas/vapor cycles, into the storing rocks.

From the aspect of the process according to the invention it is considered as preferable, if the potassium-, ammonium- and/or zirconium compounds for stabilizing the storing rocks are introduced continuously or discontinuously, in one or more injecting plugs, in continuously or gradually increasing or decreasing concentrations, with or without inserting further separating fluid plugs, in suitable organic solvent(s) or in a mixture of organic solvent(s) and/or in a mixture of organic and inorganic solvent(s) and/or in suitable dispersions into the storing rock.

Without specifying the full mechanism of the inhibition of clay-effect in details or examining all the possible variations thereof, we discovered and demonstrated that advantageous influence of the clay-effect, reduction or elimination of clay dispersion, becomes possible by introducing the aqueous phase of compounds to the clay minerals, which, due to their hydrated ion diameter, high number of coordination and energy of hydration, are able to be built in permanently into the structural channels of swelling clay minerals, thus modifying the structural peculiarities thereof. For this purpose cations are used which have a hydrated diameter in the range between 0.13 and 0.15 nm and a coordination number 12. It is also well known that ion-exchange and sorption features of clay minerals are firstly defined by the number and place of charges and number of coordination of the ions available for the exchange. Thus, for example, $(SiO_4)$tetrahedron always shows 4 negative charges outwards. If, in the course of the exchange, these charges are neutralized by adequate cations, penetration of alien ions becomes impossible. In this case, naturally, no change in construction in the direction of the C-axis takes place, accordingly no swelling occurs. The fixed ions cause a rather strong "contracting" effect in the layer structure. The coordination number of $Na^+$ and $Ca^{++}$ amounts to 6, whereas the $K^+$ and $NH_4^+$ ions have a coordination number 12, accordingly, these latter ions become fixed, thus stabilizing the clay structure.

In the process according to the invention for inhibiting clay-effect, every water-soluble organic or inorganic salt can be used which ensures cations of proper quality and concentration for the inhibition in the course of dissociation. Preferably clay-effect is inhibited in such a manner that the solutions of the inhibiting salt, having been selected on the basis of preliminary laboratory tests, are prepared and injected thereafter into the layer in a quantity of 0.05–0.7, preferably 0.05–5 pore space ($V_p$), followed immediately by water injection.

Concentration of the inhibiting salt to be applied depends on the extent of ion-fixation to be achieved in the course of inhibition, advantageously a normal solution is used (maximally 5.0—minimally 0.01, preferably maximally 3.0—minimally 0.01).

Favorable conditions can be obtained for injection of water under the influence of treatment with the inhibitor, wherein unity cell contracts in the direction of the C-axis, bonds of the structure will be more stable, inner hydrate water diminishes, stability of the whole rock structure increases and permeability becomes more stable. Not only the stabilizing role of clay-effect inhibition is significant, but repeated mobilization of adhesion of residue oils which were eventually isolated due to unfavorable swelling condition of clay minerals will be promoted as the state of the clay minerals becomes inverted. The same statement is valid for laminar formations remaining in transversal flow with each other.

Accordingly, the process according to the invention represents a clay-effect inhibiting process carried out by injecting fluid into fluid storing rocks, particularly hydrocarbon sites containing mineral clays and formed by sandstone, sand, marlitic sands and the like, by injecting water and aqueous solutions of chemicals. The injection of well(s) can be considerably improved by introducing into the storing rock prior to injection and/or simultaneously with injection of water or aqueous solutions having dissolved therein monovalent or multivalent cations or a mixture of cations having a hydrated diameter in the range of 0.13 to 0.15 nm and a high coordination number. Thus inhibiting ions are built-in or get fixed into the structure of 2:1 in the course of ion-exchange, reducing the cell dimension of the clay minerals in the direction of the C-axis, reducing internal sorption capacity, stopping ion-exchange and stabilizing the clay minerals while simultaneously binding surface free negative charges. As a resultant effect of all the processes, dispersion of clay minerals due to swelling and electrostatic influences ceases. Permeability of the storing rock and the porous systems also becomes stabilized, whereby injecting of water and aqueous solutions becomes possible. Thus the success of injection is improved, the storing-zone affected by the aqueous solution will be enlarged, efficiency of flooding improves, furtheron, under the effect of treatment, heterogeneity of the area to be flooded diminishes.

The advantages of the process according to the invention are as follows:

cations having a hydrated ion-diameter of 0.13 to 0.15 nm and a coordination number 12 built-in into the structural channels stabilize the clay minerals capable of swelling with a layer structure 2:1;

clay minerals capable of swelling contract in the direction of the C-axis due to built-in inhibiting cations, and improving permeability of the rock and stabilizing the rock structure, and stopping of clay dispersion do not cause new detrimental heterogeneities;

said treatment of clay minerals can be performed at low costs, using materials available in commerce, by injecting diluted aqueous solutions at the same time if liquidation of surface waters contaminated with fixed ions becomes necessary. Free exchanging capacity of clay minerals can be applied for this purpose which also ensures advantageous clay treatment, as previously described;

proper extent of treating the clay minerals between complete fixation and scarce ion-exchange can be well controlled by the chemical quality and concentration of inhibiting cations used, optionally by using ion-mixtures;

inhibition of clay-effect need not be performed prior to injection of water, it can be performed later during the operation. It is not necessary to work with solutions of constant concentration;

constant ion-proportions of the mixtures need not be maintained as in the case of plugs of graduated concentrations, one can comply with the extent of treatment determined by the rock in a more flexible manner.

We claim:

1. In a post-primary hydrocarbon recovery process including the injecting of solution in water, in one or more organic solvents, or in a mixture of one or more organic solvents and one or more inorganic solvents, into rock strata containing the hydrocarbon to be recovered, the improvement which comprises stabilizing said rocks containing swellable clay minerals, the rock strata including sandstones, sands and marlitic sandstones, water storing rocks, geothermal circulation sites and zones in the vicinity of hydrocarbon production wells, which stabilizing comprises the steps of
   (a) forming an aqueous solution of from about 0.1 to about 500 g/l of a compound or mixtures of compounds having a cation or cations with a hydrated cation diameter of between about 0.13 and about 0.15 nm, and a coordination number of 12; and
   (b) injecting the solution of step (a) into said rock strata.

2. The process of claim 1 wherein the concentration of said compounds is from about 0.1 to 300 g/l.

3. The process of claim 1 wherein the amount of said aqueous solution injected is from about 50 to 3000 $m^3$.

4. The process of claim 1, wherein the amount of said solution injected is from about 0.5 to about 5,000 $m^3$.

5. The process of claim 1, wherein the cation is one or more of $K^+$, $NH_4^+$, and $ZrO^{++}$, and the proportion of said ratios in said compounds is $K^+:NH_4^+=0.01$ to 500; $K^+:ZrO^{++}=0.01$ to 300; and $(K^++NH_4^+):ZrO^+=0.01-300$.

6. The process of claim 1, wherein said compounds are injected into said rock strata with water, steam, or a mixture of water and steam and a vapor containing an organic compound, together with a gas or a mixture of gases containing water or steam, or a mixture of water and steam, in at least one slug.

7. The process of claim 6, wherein the compounds are introduced into the rock strata in an aqueous solution, in a steam phase, or a combination of both, during at least one aqueous or gas/vapor cycle.

* * * * *